INVENTOR.
ALFONSO S. ESCOBOSA

BY *[signature]*

ATTORNEY

INVENTOR.
ALFONSO S. ESCOBOSA
BY
ATTORNEY

INVENTOR.
ALFONSO S. ESCOBOSA

BY Roger M. Pitts

ATTORNEY

United States Patent Office 3,489,889

Patented Jan. 13, 1970

3,489,889
REDUNDANT SIGNALLING APPARATUS HAVING IMPROVED FAILURE EXCLUSION

Alfonso S. Escobosa, Placentia, Calif., assignor to North American Rockwell Corporation, a corporation of Delaware Filed Sept. 28, 1966, Ser. No. 582,579
Int. Cl. G06g 7/48
U.S. Cl. 235—184 8 Claims

ABSTRACT OF THE DISCLOSURE

Redundant signalling means having reduced sensitivity to a signalling failure in one of the redundant signalling channels. Nonlinear admittances are employed in the output summing means cooperating with the redundant signalling channels, for limiting the response of a given channel to a "hardover" failure thereof. Thus, self-monitoring of the redundant signalling device is achieved.

The concept of improving the reliability of both static and dynamic performance of signal translating means by the use of a plurality of redundant signalling channels in a novel feedback arrangement has been disclosed in U.S. Patent No. 3,243,585 issued Mar. 29, 1966, to the inventor of the subject invention. In the description of the operation of such device for several different types of failures and combinations of failures, is included the description of the response of such a system to a so-called "hard-over" or maximum signal type of failure in one of the signalling channels. Such response is manifested as a compensatory bias in each of the remaining operative channels of the system, whereby the static gain and dynamic response of the system output are substantially unaffected by such failure. An associated disadvantage suffered, however, is that the system control authority, or maximum output response may be reduced by the amount of such compensatory bias. Alternatively, severe design restrictions may be imposed upon the gains and impedance ratios employed in the designs of the amplifiers for such signalling channels, for controlling a given actuator or controlled element. By means of the concept of the subject invention, the output level of a given stage in each of the redundant signalling channels is preselectively limited, whereby the biasing effect of a "hard-over" failure is reduced and a disadvantage of such prior-art redundant signalling system is avoided.

Accordingly, an object of the subject invention is to provide highly-reliable redundant signal translating means having reduced sensitivity to a hard-over failure in one of the component redundant signalling channels thereof.

Another object of the invention is to avoid reducing the control authority of a multiple channel signalling system in response to a hard-over failure.

It is still another object of the invention to provide hydraulic circuit means for reducing the sensitivity of a multiple channel hydraulic system to a failure in said hydraulic system.

These and other objects of the invention will become apparent from the following description taken together with the accompanying drawings, in which:

FIG. 1 is a block diagram of a system embodying the concept of the invention.

FIGS. 2*a* and 2*b* are diagrams illustrating preferred response characteristics of the non-linear admittance elements of FIG. 1.

In the figures, like reference characters refer to like parts.

Figure 1:
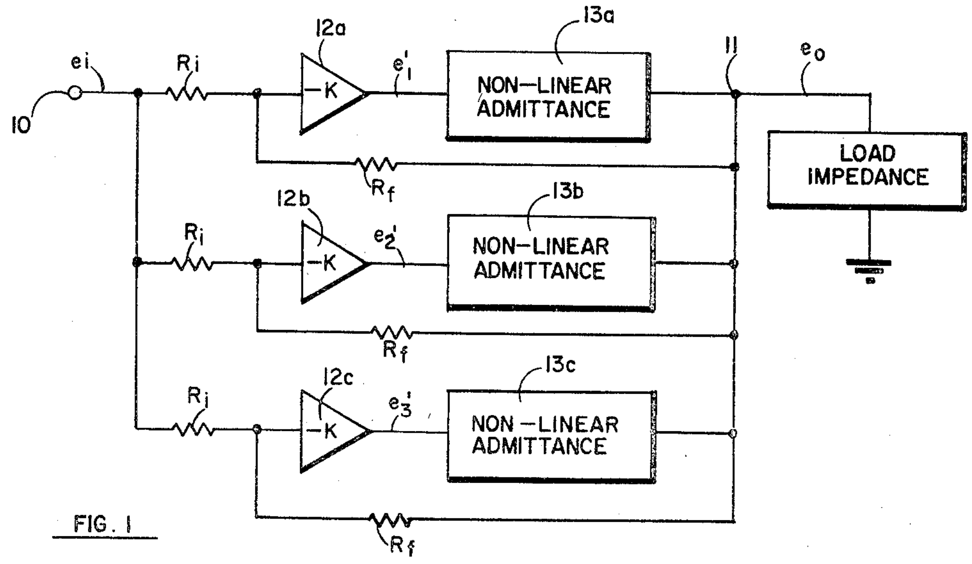

Referring now to FIG. 1, there is illustrated in block diagram form a system embodying the inventive concept. There is provided a multiple channel feedback signalling system, in which the input impedances $R_i$ of a plurality of like signalling channels are commonly responsive to a single common input excitation $e_1$ (applied at input terminal 10), the signal outputs, $e'$, of the channels are commonly combined at an output summing means, and in which an output $e_0$ of the summing means (at terminal 11) is commonly fed as a negative feedback signal to an input impedance $R_f$ of each of the signalling channels. Negative feedback is obtained from the phase-inversion property of a high-gain amplifier 12 in the forward loop of each of the signalling channels, while output summing is provided by means of a like plurality of coupling impedances 13 as signalling channels, a first terminal of each impedance being commonly connected to form summing output terminal 11, and a second terminal of each coupling impedance being connected to the output of an associated amplifier. A general description of the construction and arrangement and modes of operation of such redundant signalling systems is included in my U.S. Patent No. 3,243,585.

As is described more fully in U.S. Patent No. 3,243,-585, where conventional summing resistors (or linear admittances) are used for the output summing elements 13 connected to output terminal 11, under normal signalling conditions, each of the like signalling channels of the redundant signalling system respond to provide a driving signal in accordance with the difference between the combined system output (on terminal 11) and the common input thereto (on terminal 10). Upon the occurrence of a hard-over failure (or maximum signal bias state) of one of the signalling channels of FIG. 1, the result is a reduction of system control authority due to the compensatory signal bias states arising in the remaining operative closed-loop channels.

An ideal way to avoid the effects of such hard-over failure would be to automatically switch-out the failed channel by means of monitoring equipment. However, as discussed in U.S. Patent No. 3,243,585, such an approach involves the inclusion of additional equipment and complexity as to reduce, rather than enhance, overall system reliability.

The concept of the subject invention includes the substitution of nonlinear admittances for the output summing impedances 13*a*, 13*b* and 13*c* of the multiple closed-loop signalling system of FIG. 1, to provide reduced sensitivity to hard-over failures, while avoiding exclusive reliance upon monitoring techniques for "first failure" detection. An idealized response of one of such non-linear admittances is shown in FIGS. 2*a* and 2*b*.

Figure 2A:
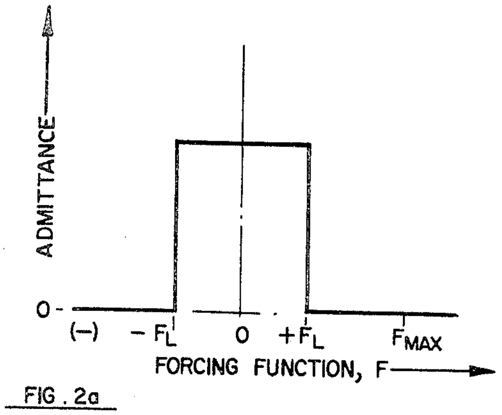

Referring to FIG. 2*a*, there is illustrated a diagram of a preferred response of the non-linear admittances 13 of FIG. 1 as a function of an applied input or forcing function, corresponding to the output of an associated one of amplifiers 12 of FIG. 1. Such admittance characteristic is seen to be fixed at a finite value other than null or zero within selected limits ($+F_1$ and $-F_1$) of the forcing function, F; and reduces to a null or zero outside those limits. Such limits are selected to correspond to a nominal signal input, less than that representing a maximum limit excitation useable by the load impedance (of FIG. 1) or other signal utilizing means and more than an average error signal magnitude. Hence, any forcing function magnitude greater than $F_1$ is deemed indicative of a signalling channel failure and ideally results in no output of the coupling admittance 13 in response thereto. In this way, no large compensatory biases arise in the remaining operative channels due to a hard-over failure in one inoperative channel, and the system control authority is not reduced.

Figure 2B:
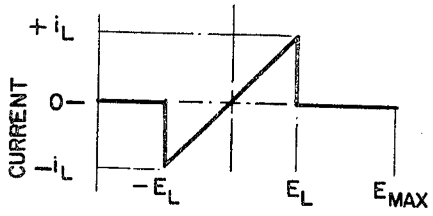
Figure 3:
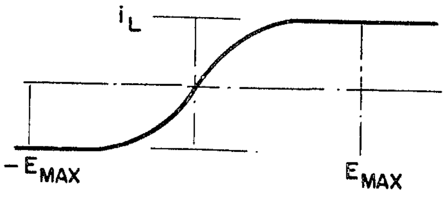
FIG. 3 is a diagram of the representative response of a limiter circuit as one form of non-linear admittance.

Such non-linear admittance characteristic of FIG. 2*a*, may be alternatively represented in terms of the output response versus the forcing function, as shown in FIG. 2*b*, for an electrical admittance of current flow, *i*, versus an input voltage excitation or forcing function, E. The finite slope about the origin in FIG. 2*b* thus corresponds to the non-null value of the admittance function plotted in FIG. 2*a*, while the null output region of FIG. 2*b* corresponds to the null admittance region of FIG. 2*a*. An alternate form of response to that of FIG. 2*b* is shown in FIG. 3, whereby a limited output response other than null is obtained outside the linear response region, and corresponds to a saturable electrical signalling element, exemplary forms of which circuit are shown more particularly in FIGS. 4 and 5.

Figure 4:
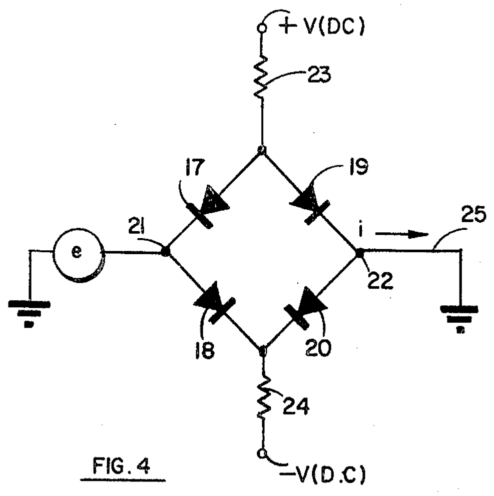
FIG. 4 is a circuit diagram of an exemplary output limiting circuit for the non-linear admittance element of FIG. 1.

In FIG. 4, there is illustrated an electrical signal-limiting impedance comprising four unidirectionally-conducting impedances or diodes 17, 18, 19 and 20, opposite electrodes of a first and second one (17 and 18) of diodes 17, 18, 19 and 20, being interconnected to form an input terminal 21, while opposite electrodes of a third and forth one (19 and 20) of diodes 17, 18, 19 and 20, being interconnected to form an output terminal 22. In such arrangement, a like second (anode) electrode of each of the first and third diodes (17 and 19) are coupled through a first isolating resistor 23 to a first bias potential (of positive polarity), and a like second (cathode) electrode of the second and fourth diodes (18 and 20) are coupled through a second isolating resistor 24 to a second bias potential having a polarity opposed to that of the first bias potential. In other words, the first and third diodes 17 and 19 and the second and fourth diodes 18 and 20 are respectively connected back-to-back.

In normal operation of the arrangement of FIG. 4, the current, *i*, produced in the current path 25 between output terminal 22 and ground, in response to a grounded excitation source applied to input terminal 21, will tend to be limited in terms of the magnitude of the applied bias potentials and the isolating resistors 24 and 25. Such current path 25 may comprise, for example, a low-input impedance load or other signal utilizing means. Hence, the use of such devices for non-linear summing impedances 13 in FIG. 1 tends to reduce or attenuate the effect on system performance due to a hard-over signal failure. Such a failure may occur, for example, where the feedback impedance $R_f$ of one of the signal channels open-circuits, whereby the high gain of an associated one of amplifiers 12 results in an output signal substantially greater than the system maximum response authority.

Figure 5:
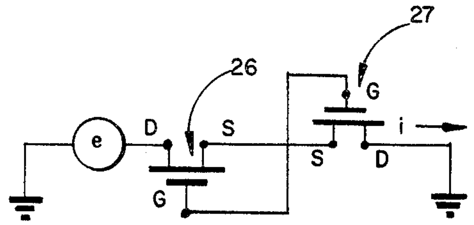
FIG. 5 is a circuit diagram of an alternate embodiment of the electrical signal-limiting means of FIG. 4.

An alternative to the non-linear impedance of FIG. 4 is shown in FIG. 5.

The alternative electrical limiting arrangement of FIG. 5 comprises a pair of field-effect transistors 26 and 27, each having a source terminal S, drain terminal D and a gate (or control) terminal G. In such alternative arrangement, the gate terminals G and source terminals S of transistors 26 and 27 are commonly connected, the drain terminal of each of transistors 26 and 27 comprising a respective input and output terminal (corresponding to terminals 21 and 22 of FIG. 4). The cooperation of a given one of the transistors with an associated gate electrode tends to limit the current flow therethrough in one direction, while the cooperation of the other of the two transistors and its associated gate electrode tends to limit current flow in the opposite direction, in the response of the combination to a source of bipolar excitation applied to drain terminal D of transistor 26. The saturation limit of such arrangement is a function of the specific transistor design employed, but may be adjusted by the use of either adjustable gain, or adjustable attenuating, elements interposed between the excitation source and the input of a utilizing impedance, as is well understood in the art.

Although the device of FIG. 1 has been described in terms of an electrical signalling device, employing limiting circuits such as those shown in FIGS. 4 and 5, the concept of the invention is not so limited. The inventive concept is equally applicable to a redundant hydraulic signalling circuit, as shown more particularly in FIG. 6.

Figure 6:
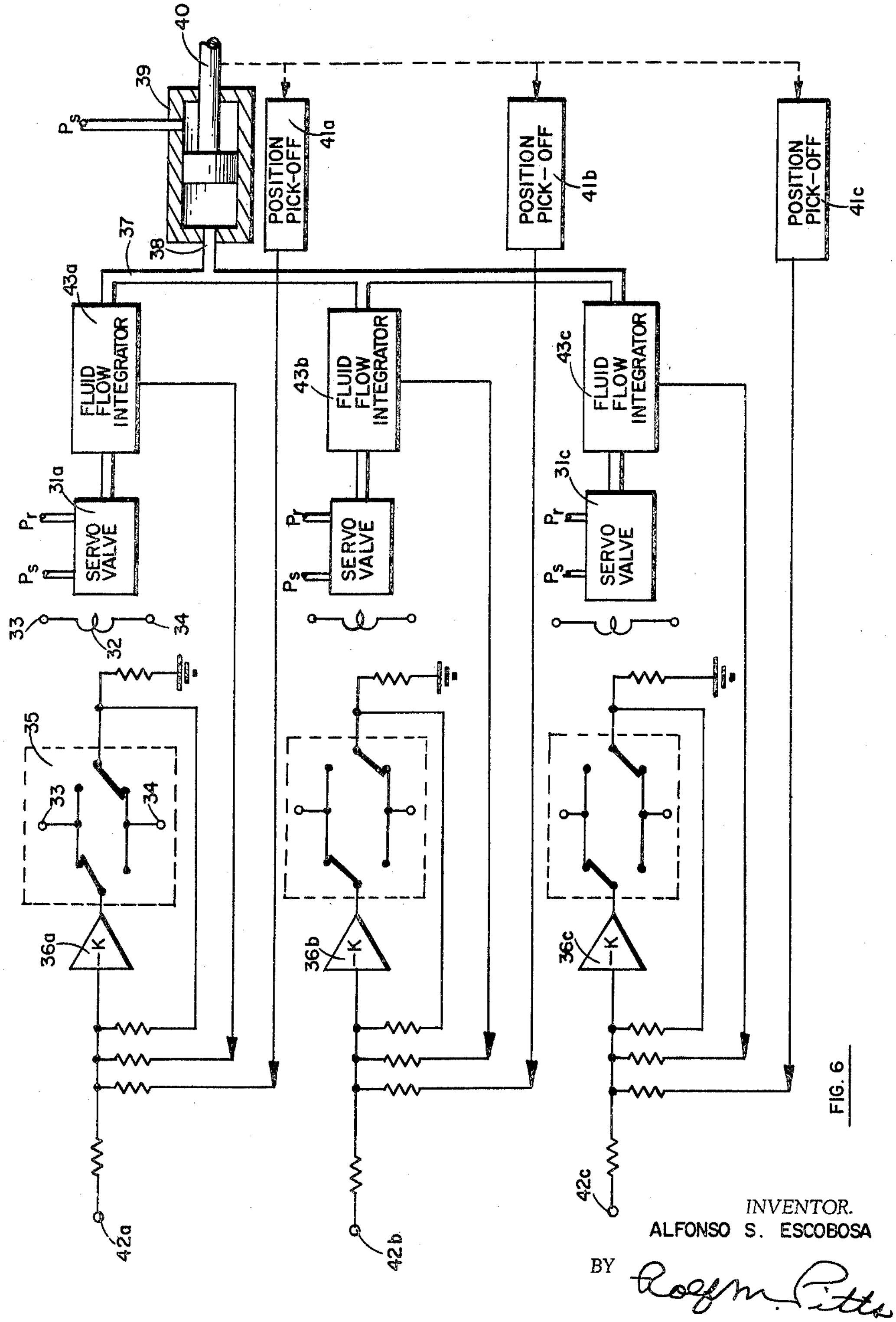
FIG. 6 is an alternate embodiment of an electrohydraulic system, embodying the concept of the invention.

Referring now to FIG. 6, there is illustrated a schematic arrangement of an electrohydraulic servo system comprising a plurality of hydraulic signalling stages. Each hydraulic signalling stage employs an electro-hydraulic transfer valve 31 including an excitation winding 32 connected across terminals 33 and 34 of a commutated A-C electric signalling stage 35, for synchronous demodulation of the sum of the A-C inputs ton an A-C summing amplifier 36. A more complete description of servo valve 31 and the commutataing means 35 for bipolar D-C excitation of valve 31, is given in my copending application Ser. No. 417,148 filed Dec. 9, 1964, for Synchronous Demodulating Means (now U.S. Patent 3,424,990).

The controlled-flow fluid outputs of the valves 31 are combined by a flow-summing manifold 37 for application to the controlled flow input 38 of a single-ended hydraulic actuator 39 having an output member 40. The construction and arrangement of summing manifold 37 and motor 39 are more fully described in co-pending application Ser. No. 399,454, filed Sept. 28, 1964, by Clarence W. Asche, assignor to North American Aviation, Inc., assignee of the subject invention, now issued as U.S. Patent 3,279,323.

In the servo arrangement of FIG. 6, a lineal position pick-off 41, responsive to motion of output member 40 and preferably of the A-C type, is employed with each of summing amplifiers 36 to provide a negative feedback signal, while the input terminal 42 of each of amplifiers 36 is connected to a separate source (not shown) of like input signals or, alternatively, may be commonly connected to a single common input signal source (not shown). A-C signalling stages are preferred in certain applications of a closed loop system because of the improved resolution generally available from A-C type sensors, as described in my U.S. Patent No. 3,136,224, issued June 9, 1964, for Dual Flow-Synchronized Electrohydraulic Servo and included in which patent is a fuller description of an A-C lineal position pick-off.

Also included in the arrangement of FIG. 6 is a fluid flow limiter **43*a*, 43*b*, and 43*c* interposed at the output of each of valves 31*a*, 31*b* and 31*c*, and an associated input to flow summing means 37. Such limiter provides a limited, preferably null, hydraulic flow rate in response to a time integral of hydraulic fluid flow above a selected amount. Each of flow limiters 43*a*, 43*b* and 43C may also provide an electrical output indicative of the time integral of the flow-rate therethrough. Such electrical output may be employed as an additional negative feedback input to an associated one of the A-C summing amplifiers 36*a*, 36*b* and 36*c*. Each of the hydraulic flow limiting devices 43** of FIG. 6 is similarly constructed and arranged, which construction and arrangement is shown more particularly in FIG. 7.

Figure 7:
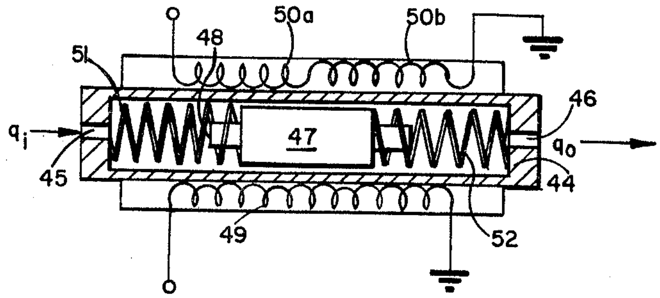
FIG. 7 is a schematic arrangement of one of the hydraulic flow limiting devices of the system of FIG. 1.

Referring to FIG. 7, there is shown, in schematic form a preferred arrangement for the hydraulic flow limiting device employed in FIG. 6. There is provided a housing 44 having a port 45 and 46 at either axial extremity thereof and comprising a respective input and output port, adapted to be connected to the controlled fluid output of one of transfer valves 31 (of FIG. 6) and to an input of fluid summing means 37 (of FIG. 6), respectively. A piston 47 is slidably mounted in housing 44 for axial reciprocal motion relative thereto, and having a preselected radial clearance therein for allowing a limited leakage flow internally of housing 44, from one end thereof to the other, in response to a fluid pressure difference across piston 47. Piston 47 and housing 44 further cooperate, in either of two opposite axial limits of the motion of piston 47, as a valve seat to prevent fluid flow in response to the sense of that pressure differential resulting in such motion limit of piston 47. In other words, in the illustrated arrangement of FIG. 7, a pressure differential forcing piston 47 to the left would cause a valve face 48 of piston 47 to seat in orifice 45 of housing 44, thereby preventing further fluid flow in response to the sense of such pressure differential.

Also, included in the arrangement of FIG. 7 is an A-C pick-off comprising an excitation winding 49 and a pick-off winding, the pick-off winding schematically indicated as a split winding comprising two axially contiguous, serially connected, winding sections **50*a* and 50*b*, each wound oppositely with respect to the other. Where housing 44 is of a non-magnetic metal and where piston 47 is of a magnetic material, then piston 44 cooperates with the windings 49, 50*a* and 50*b*** as an A-C pick-off to provide an A-C signal having a phase and amplitude indicative of the displacement thereof from an electrical and mechanical null position, as is described fully in the above mentioned U.S. Patent No. 3,136,224.

The device of FIG. 7 functions as a first order lag type of mechanical integrator within the flow limits thereof, rather than as a perfect integrator due to the inclusion of very light, or weak, centering springs 51 and 52. The purpose of such centering springs is to avoid unnecessary biasing of the flow integrator over long time-intervals of balanced flow from operative ones of the plurality of hydraulic signalling channels of FIG. 6.

Low gain electrical feedback from each of the flow limiters 43 to an associated one of the summing amplifiers **36*a*, 36*b* and 36*c*** (in FIG. 6) may be included in order to reduce the effects of gain differentials, or tolerances, between the several signalling channels of FIG. 6, and therefor tend to reduce minor performance assymmetries between operative signalling channels.

Upon a substantial pressure differential occurring across the ports 45 and 46 of the flow integrator arrangement of FIG. 7, overcoming the centering springs 51 and 52, piston 44 will move in response to such differential pressure. Where the sense of such differential persists for an interval which results in a flow rate time integral sufficient to seat piston 47 at an axial extremity of housing 44, thus blocking an associated one of ports 45 and 46, then flow through the integrator is blocked. The flow integrator will remain blocked until the pressure differential reverses sense. Where, of course, such large pressure differential of a selected sense results from a hard-over failure in the associated signalling stage (of FIG. 6), the blocked flow integrator effectively disconnects the fluid output of such stage from the flow summing manifold 37 for as long as such hard-over failure condition exists.

Accordingly, it is to be appreciated that the hydraulic impedance element of FIG. 7 provides a two-state admittance element, corresponding to the performance function illustrated in FIG. 2*a*, the limits $\pm F_1$ representing a preselected time-integral of flow rate (or preselected displacement of piston 47) and the discrete admittance value above zero corresponding to flow rate per unit of pressure differential. In other words, the impedance element of FIG. 7, corresponding to one of elements **43*a*, 43*b* and 43*c*** of FIG. 6, represents the idealized admittance element sought the response of which is illustrated in FIG. 2*a*.

It is also to be appreciated that, although the embodiment of FIG. 6 has been described in terms of a redundant hydraulic signalling system, employing non-linear hydraulic summing impedances of the type illustrated in FIG. 7, the concept of FIG. 6 is not so limited. Where each of the electrical signalling stages of FIG. 6, itself, comprises a redundant multiple-channel signal stage, similar to that of FIG. 1, then each such multiple-channel electrical signalling stage may also employ a non-linear output summing admittance, as taught above in connection with the description of FIG. 1.

Hence, it is to be understood that there has been described an improved, self-monitoring redundant signalling system. By means of such self-monitoring function, large performance assymmetries between the several channels of such multiple channel system need not reduce the system control authority or system response to large signals. Instead, the system response to a malfunctioning channel is limited or prevented by means of a nonlinear admittance, thereby reducing any biases induced in the operative channels of the multiple channel signalling system.

Although the invention has been illustrated and described in detail, it is to be clearly understood that the same is by way of illustration and example only and is not to be taken by way of limitation.

I claim:

1. In a multiple channel feedback signalling system in which the inputs of a plurality of at least three like signalling channels are commonly responsive to a single common input excitation and in which the outputs of said channels are commonly combined at an output of said system, and in which said output of said system is commonly fed as a negative feedback signal to an input of each of said signalling channels, the improvement comprising signal limiting summing means interposed between said output of each said signalling channel and said output of said system for separately limiting the maximum output of each signalling channel which is combined at said output of said system, whereby compensatory bias responses of said system to a hardover failure in a single channel thereof are reduced.

2. The device of claim 1 in which each of said signalling channels comprises electrical signalling means and in which each said signal limiting means comprises electrical signal limiting means for limiting a resultant electrical signal to a preselected maximum level.

3. The device of claim 2 in which said summing means comprises a plurality of signal limiting impedances having a common output terminal, each of said signal limiting impedances having an input terminal connected to the output of a mutually exclusive one of said electrical signalling stages.

4. The device of claim 3 in which each of said signal-limiting impedances comprises four unidirectionally conducting impedances, opposite electrodes of a first and second one of said impedances being interconnected to form an input terminal, opposite electrodes of a third and fourth one of said impedances being interconnected to form an output terminal, a like second electrode of each of said first and third impedance being coupled through a first impedance to a direct current source of a first bias potential, and a like second electrode of said second and fourth impedances being coupled through a second load impedance to a bias potential having a polarity opposed to that of said first bias potential, whereby said first and third and said second and fourth impedances are respectively connected back-to-back.

5. The device of claim 3 in which each of said signal limiting impedances comprises a pair of field effect transistors, each having a source terminal, drain terminal and gate terminal, in which the gate terminals and source terminals of said transistors are commonly connected, the drain terminal of each of said transistors comprising a respective input and output terminal.

6. The device of claim 1 in which each of said signalling channels comprises electrohydraulic signalling means for providing a fluid flow output in response to an applied electrical signal input, and in which each said signal limiting means comprises hydraulic flow limiting means for limitng said fluid flow output in response to a time integral of hydraulic flow above a preselected amount.

7. The device of claim 6 in which each said hydraulic flow limiting means comprises a housing having a port at either axial extremity thereof and comprises a respective input and output port connected to the output of said hydraulic signalling stage and to an input of said summing means, respectively, a piston slidably mounted in said housing for reciprocal motion relative thereto and having a preselected radial clearance therein for allowing a limited leakage flow internally from one end of said housing to the other in response to a pressure difference therein; said piston and housing cooperating in either of two opposite axial limits of the motion of said piston as a valve seat to prevent fluid flow in response to the sense of that pressure differential resulting in such motion limit of said piston.

8. The device of claim 7 in which there is further included spring-load recentering for recentering the axial position of said piston in the absence of a pressure differential above a preselected value.

References Cited

UNITED STATES PATENTS

| | | | |
|---|---|---|---|
| 3,014,185 | 12/1961 | Montner | 330—8 |
| 3,065,911 | 11/1962 | Creusere | 330—8 X |
| 3,070,071 | 12/1962 | Cooper | 91—363 |
| 3,095,783 | 7/1963 | Flindt | 91—363 |
| 3,095,784 | 7/1963 | Colhoun | 91—363 |
| 3,221,609 | 12/1965 | Frantz | 91—363 |
| 3,283,229 | 11/1966 | Lindahl | 318—18 |
| 3,338,138 | 8/1967 | Wood | 244—78 |

MALCOLM A. MORRISON, Primary Examiner

F. D. GRUBER, Assistant Examiner

U.S. Cl. X.R.

91—363; 318—18; 244—77, 78